United States Patent [19]

Hochreiter et al.

[11] 4,052,730
[45] Oct. 4, 1977

[54] DOUBLE EXPOSURE PREVENTION DEVICE

[75] Inventors: William Thomas Hochreiter; Fredric Alton Mindler, both of Rochester, N.Y.

[73] Assignee: Eastman Kodak Company, Rochester, N.Y.

[21] Appl. No.: 678,271

[22] Filed: Apr. 19, 1976

[51] Int. Cl.² .............................................. G03B 15/03
[52] U.S. Cl. .................................... 354/135; 354/207
[58] Field of Search ............... 354/126, 127, 135, 142, 354/207

[56] References Cited

U.S. PATENT DOCUMENTS

| 2,322,067 | 6/1943 | Soreny ................................. 354/135 |
| 3,968,507 | 7/1976 | Stoneham et al. .................. 354/135 |

*Primary Examiner*—John Gonzales
*Attorney, Agent, or Firm*—T. H. Close

[57] ABSTRACT

A camera having a self cocking shutter with a shutter actuating member for initiating exposures and a piezoelectric flash device with a flash firing spring that is cocked in concert with film advance, includes a double exposure prevention latch that disables the shutter actuating member when the flash firing spring is not cocked.

3 Claims, 6 Drawing Figures

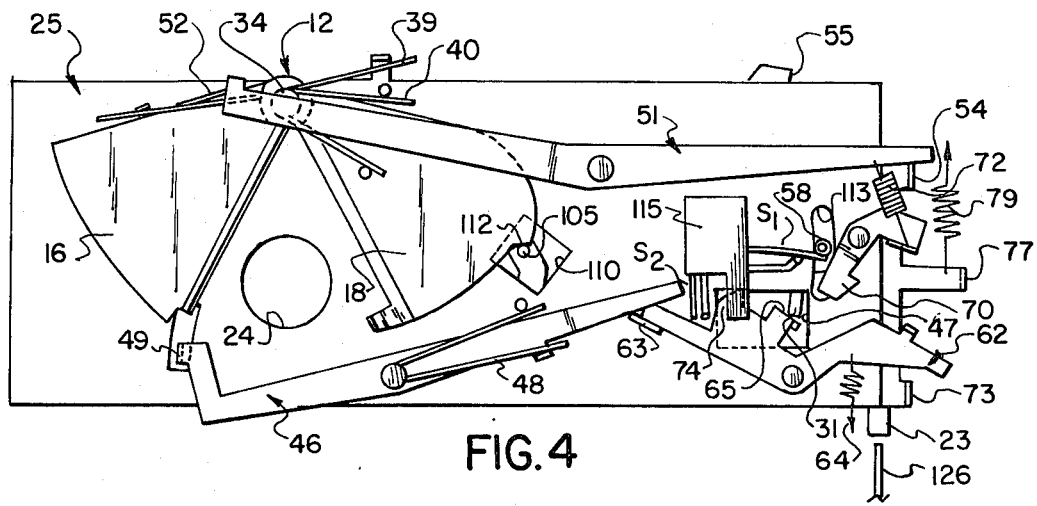
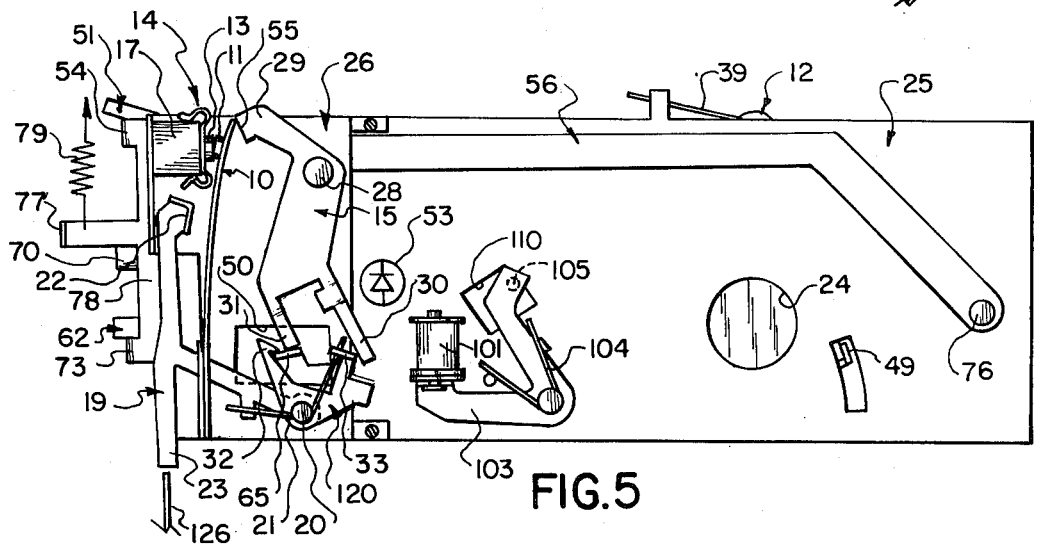
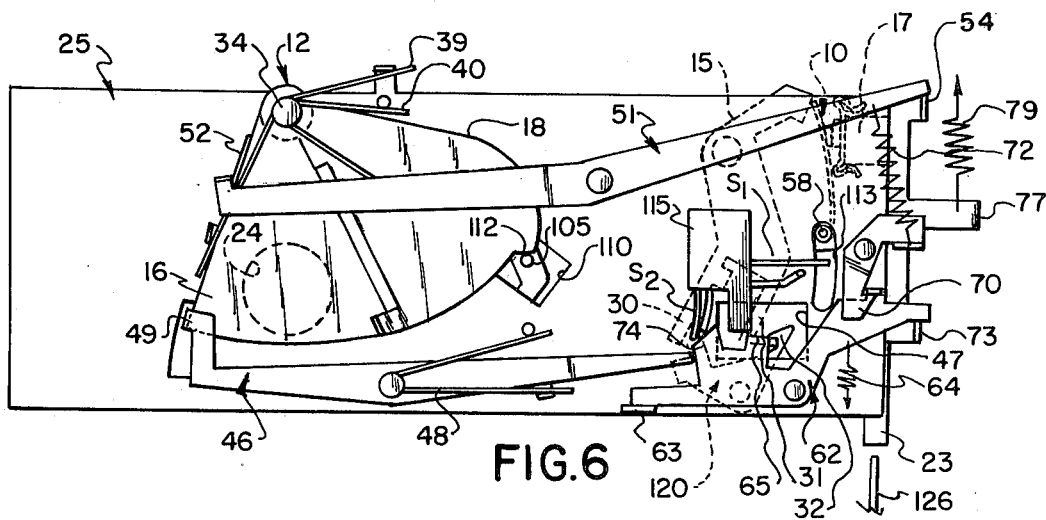

DOUBLE EXPOSURE PREVENTION DEVICE

BACKGROUND OF THE INVENTION

1. Field of the Invention

The present invention relates to photographic apparatus and, more particularly, to an improved mechanism for preventing double exposure in such apparatus having a self cocking shutter and a piezoelectric generator for flash operation.

2. Description of the Prior Art

In cameras of the type having self cocking shutter, i.e., shutters which are automatically cocked by the return of the body release member, it is known in the art to provide means for disabling the shutter to prevent a second shutter actuation prior to film advance. Generally such double exposure prevention means have taken the form of linkages that block the body release member of the camera and do not allow a second exposure to be made until after a subsequent film advance operation has been completed. The linkage is connected to the film metering mechanism and the blockage of the body release member is removed during the film advance operation.

Recently, apparatus has been developed in which a plurality of flashlamps, each fireable by means of an electric pulse generated by a piezoelectric crystal, are assembled in a multilamp array. In one such array, all of the lamps are aligned in the same direction and each lamp has its own reflector. A switching mechanism is provided, internal to the array, for properly sequencing firing of the individual lamps. In photograhic apparatus adapted to utilize such an array, a piezoelectric crystal striking mechanism is provided, including a firing spring with an associated hammer, movable from a latched position to strike the piezoelectric crystal and thereby generate an electric pulse. In addition, a cocking mechanism is provided for moving the firing spring to its latched position subsequent to each actuation. Whether this cocking function is performed automatically in conjunction with some other function of the camera, such as film advance, or manually by the camera operator, it is desirable to disable the shutter of the camera until the cocking function has been performed to guard against the possibility of an attempted flash exposure before the flash firing mechanism has been cocked. Likewise, it is desirable to disable both the shutter and the flash-firing mechanism subsequent to each activation until the film has been advanced.

SUMMARY OF THE INVENTION

Accordingly, photographic apparatus having a shutter and a flash firing mechanism including a spring for storing and releasing energy to actuate a flash device is provided with a double exposure prevention latch which cooperates with the shutter and the flash firing mechanism to prevent the shutter from effecting an exposure when energy is not stored in the flash firing spring.

In a preferred embodiment of the invention, the double exposure prevention latch has a first end forming a hook that latches a lug on an actuator member of the shutter to prevent exposure initiating movement of the actuator member when the spring in the flash firing mechanism is not cocked. A second end on the double exposure prevention latch cooperates with a leg on a firing spring latch that releasably holds the flash firing spring in a cocked state. The leg on the firing spring latch moves the first end of the double exposure prevention latch out of engagement with the lug on the actuator when the flash firing mechanism is cocked.

DESCRIPTION OF THE DRAWINGS

In the detailed description of the preferred embodiment of the invention described below, reference is made to the accompanying drawings in which:

FIG. 4 is a rear view showing the relative positions of the shutter elements while the mechanism is in the state shown in FIG. 3;

FIG. 5 is a front view of the apparatus showing the relative positions of the piezoelectric flash firing mechanism and the double exposure prevention latch after exposure is completed but prior to cocking of the piezoelectric device; and FIG. 6 is a rear view showing the relative positions of the shutter elements while the mechanism is in the state shown in FIG. 5.

DESCRIPTION OF THE PREFERRED EMBODIMENT

Figure 1:
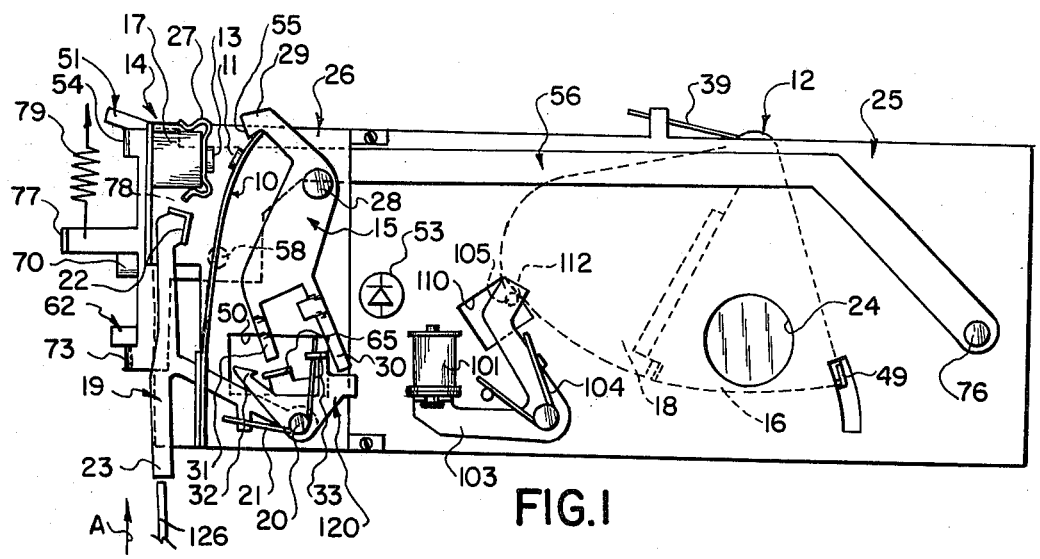
FIG. 1 is a front view of the photographic apparatus incorporating a double exposure prevention feature according to the invention and showing the piezoelectric flash firing mechanism in cocked position.

Because photographic apparatus is well known, the present description will be directed in particular to elements forming part of, or cooperating more directly with, the present invention. Elements not specifically shown or described herein are understood to be selectable from those known in the art.

Referring to the accompanying drawings, there is shown a portion of a photographic apparatus incorporating a double exposure prevention feature according to a preferred embodiment of the invention. The apparatus includes: a first mechanism plate 25 which defines an exposure aperture 24; a shutter assembly generally designated 12; a second mechanism plate 26 mounted on mechanism plate 25; a piezoelectric generator assembly generally designated 14 and a double exposure prevention latch 120.

THE SHUTTER ASSEMBLY

Figure 2:
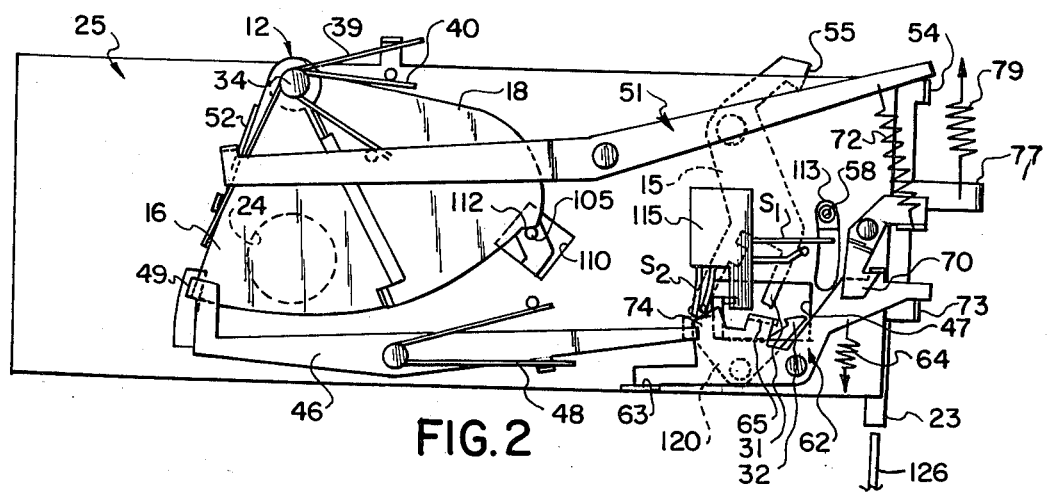
FIG. 2 is a rear view of the apparatus of FIG. 1 showing the relative positions of the shutter elements while the mechanism is in the state shown in FIG. 1.

As best seen in FIG. 2, the shutter assembly 12 includes an opening blade 16 and a closing blade 18. The shutter blades 16 and 18 are opaque elements mounted on a stud 34 on plate 25. When the shutter 12 is cocked, springs 39 and 40 respectively urge the blades 16 and 18 to move in a clockwise direction, as viewed in FIG. 2, to respectively uncover and cover the exposure aperture 24.

A blade latch 46, urged into a latching position by a leg spring 48, retains the shutter 12 in its cocked position. In such a position, a tab 49 on the blade latch 46 engages and holds the lower leading edge of the blade 16, as shown in FIGS. 1 and 2. When the shutter 12 is cocked, the blade 16, covers the exposure aperture 24; and through an abutting relationship of its trailing edge with the leading edge of the blade 18, it retains the blade 18 in a position to one side of the exposure aperture 24, e.g., the right side in FIG. 2. When the apparatus is in the cocked position, a shutter-cocking element 51, whose function will be described later, engages a raised portion 52 of the leading edge of the blade 16, element 51 being held in that position by a trip lug 54 of a release member 56. The engagement of element 51 with blade 16 is not functional in retaining the shutter 12 in the cocked position, and is removed as the release member 56 is operated. The blade latch 46 is released by an impact actuator 62 that is pivotally mounted on the plate 25 and biased by a spring 64 for clockwise movement, as viewed in FIG. 2. The impact actuator 62 includes: a lug 63 adapted to engage one end of the blade latch 46, an upright extension 74, and a lug 65 which extends through a hole 47 in plate 25 and a hole 50 in plate 26. The function of the lug 65 will be described later.

A latch 70, positioned in its latching position by a spring 72 connected between one end of the cocking element 51 and one end of the latch 70, holds the actuator 62 in its tensioned position. When the cocking element 51 is moved to cock the shutter 12, it stretches the spring 72, creating tension therein to draw the latch 70 into its latching position. The spring 72 also pivots the cocking element 51 clockwise out of contact with the blade 16 as the release member 56 positions the actuator 62 to be latched by the latch 70. The upright extension 74 on the actuator 62 engages and holds a normally open switch $S_2$ closed. The switch $S_2$, a shutter timing switch of an exposure control circuit (not shown), is opened in conjunction with movement of the actuator 62 to release the blade latch 46. The start of shutter timing is thus synchronized with opening of the exposure aperture 24 by the blade 16.

As may best be seen by reference to FIG. 1, the release member 56, previously referred to, is elongated and pivotally mounted to the plate 25 at a post 76. An extension 77, located on a body portion 78 thereof, may be accessible from an exterior portion of the camera by a camera operator. The release member 56 is held in the position of FIG. 1 by a spring 79.

An electromagnet 101 and associated armature 103 cooperate to control the shutter 12 in conjunction with the operation of the release member 56. The electromagnet 101 is controlled by the exposure control circuit (not shown) in a manner more fully described in commonly assigned, copending U.S. Pat. application Ser. No. 637,515, filed Apr. 5, 1976 in the name of W. T. Hochreiter et al; and entitled EXPOSURE CONTROL MECHANISM. The exposure control circuit is switched on during initial movement of the release member 56. A spring 104 lightly biases the armature 103 toward the electro-magnet 101, and into a position in which a pin 105 on the armature 103 extends through an opening 110 in the plate 25 to engage a lip 112 on the closing blade 18. Thus the armature 103 couples the blade 18 with the electromagnet 101.

Switching of the exposure control circuit to control the electromagnet 101 is effected by a pin 58 as the release memeber 56 is operated. The pin 58 is located on the body portion 78 of the release member 56 and extends through a slot 113 in the plate 25 to contact an element of switch $S_1$. The pin 58 may be of a non-conductive material to prevent shorting the switch elements to ground when in contact therewith. The switches $S_1$ and $S_2$ are housed in a plastic mount 115 on the plate 25, such that travel of the pin 58 closes the switch $S_1$, putting the exposure control circuit in readiness for shutter timing. The switch $S_1$ is normally open but subsequently closed and held closed by the pin 58, as shown in FIG. 4. The exposure control circuit may also be encased in a plastic housing that is coupled with the mount 115 so that the switches $S_1$ and $S_2$ may be electrically connected with the circuit.

THE PIEZOELECTRIC GENERATOR ASSEMBLY

As best shown in FIG. 1, the piezoelectric generator assembly 14 includes: a piezoelectric generator 17; a piezoelectric firing spring 10; a firing spring cocking lever 19; and a firing spring latch 15. The cocking lever 19 is pivotally mounted on a post 20 on the plate 26 and is lightly biased in a counterclockwise direction to a rest position by means of a spring 21. The cocking lever 19 includes a firing spring engaging portion 22 and a leg 23 and is moved in a clockwise direction to cock the firing spring 10 by engagement of the leg 23 by a member 126 adapted to move in the direction of arrow A. The member 126 could, for example, be accessible to the operator for manual cocking of the piezoelectric firing spring, or alternatively it could be associated with a film advance mechanism (not shown) and adapted to move in the direction of arrow A upon completion of, or during, film advance.

The piezoelectric firing spring 10 comprises a flat strip of spring material which includes a fixed end mounted on a portion of the plate 26, an intermediate portion, and a free end or striker portion on which is formed a hammer 11. The intermediate portion of the firing spring 10 lies in the path of movement of the firing spring engaging portion 22 of the cocking lever 19.

The piezoelectric generator 17 includes a piezoelectric crystal (not shown), a first anvil (not shown) and a second anvil 13, the first and second anvils being positioned at opposed ends of the piezoelectric crystal. As is known in the art, the generator 17 may include one or more piezoelectric crystals with suitable electric contacts. The generator 17 is mounted by means of a spring clip shown generally as 27, which is fixed within the photographic apparatus and engages the anvil 13. While the electrical connections to the generator 17 are not shown, it is understood that an electrical lead may be connected with each of the anvils and such leads may then be connected to other portions of the photographic apparatus, such as a socket for use with a multilamp photoflash array as is disclosed in U.S. Pat. No. 3,941,447, CAMERA FLASH SOCKET.

The firing spring latch 15 is pivotally mounted on a pin 28, on the plate 26. The firing spring latch 15 includes a latching hook 29, a biasing leg 30 and an unlatching leg 31.

DOUBLE EXPOSURE PREVENTION LATCH

As best shown in FIG. 1, double exposure prevention is provided by a double exposure prevention (DEP) latch 120. The DEP latch 120 is pivotally mounted on the post 20 on the plate 26. The spring 21, which lightly biases the firing spring cocking lever 19 in a counterclockwise direction, also biases the DEP latch 120 in a clockwise direction. The DEP latch 120 includes a latching hook 32 adapted to engage the lug 65 of the impact actuator 62, and a release lug 33 which cooperates with the biasing leg 30 of the piezoelectric firing spring latch 15 in a manner to be described below.

OPERATION

The apparatus described above operates as follows. With the piezoelectric generator assembly 14 cocked as shown in FIG. 1 and the shutter assembly 12 in the position shown in FIG. 2, the release member 56 moves downwardly against the restoring force of the spring 79 as the extension 77 is depressed by the operator. During such movement, the pin 58, carried by the release member 56 closes the switch $S_1$ to energize the exposure control circuit (not shown). The trip lug 54 moves downward, and the cocking element 51 is rotated clockwise under force of the spring 72, disengaging from the blade 16 to occupy the position shown in FIG. 4. At this position in the movement of the release member 56, switches $S_1$ and $S_2$ are closed and the armature 103 is held by the electromagnet 101, thereby holding the closing blade 18 in its cocked position.

As the release member 56 continues its downward motion, the trip lug 54 engages the latch 70 to release the impact actuator 62. The DEP latch 120 is held out of engagement with the lug 65 on the impact actuator 62 by means of the biasing leg 30 of the piezoelectric firing spring latch 15 thus freeing the actuator 62 to rotate clockwise under the influence of spring 64 to release the blade latch 46. The blade latch 46 releases the opening blade 16, which moves, under the force of the spring 39, to the position shown in FIG. 4 in which the raised portion 52 on its leading edge re-engages with the cocking element 51. During movement of the actuator 62, the switch $S_2$, normally held closed, is opened. When switch $S_2$ is opened, the exposure control circuit (now shown) begins to compute the proper exposure time by means of a photosensitive element associated with the exposure control circuit, such as a photodiode 53, which is exposed to scene light.

Figure 3:
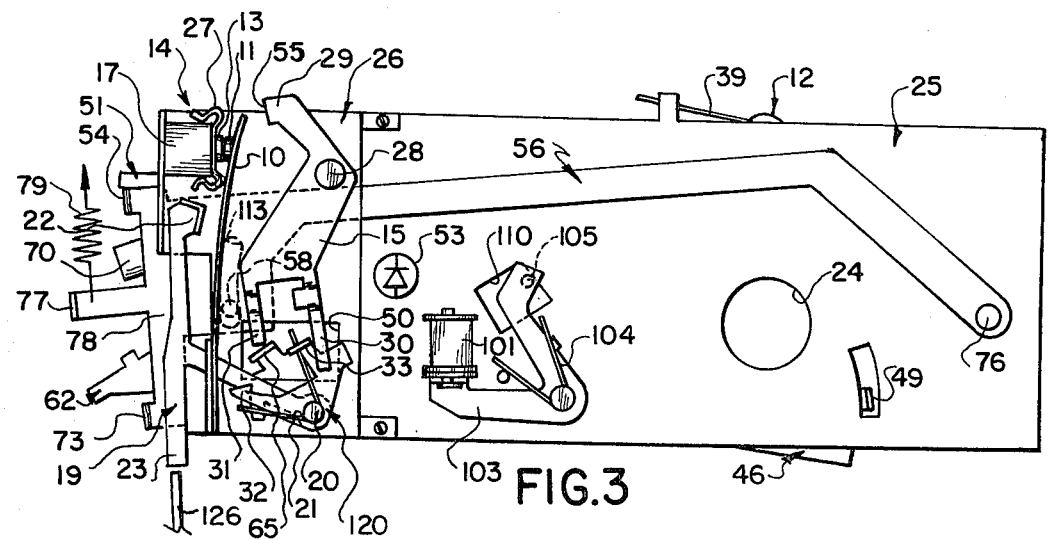
FIG. 3 is a front view of the photographic apparatus showing the relative positions of the elements of the piezoelectric flash firing mechanism while the shutter is open and the body release member is depressed.

Simultaneously with the release of latch 46 and the opening of shutter blade 16, the lug 65 on the impact actuator 62 pivots into engagement with the unlatching leg 31 of the piezoelectric firing spring latch 15, thereby releasing the latch hook 29 from the firing spring 10 as shown in FIG. 3. The firing spring 10 then rapidly moves the hammer 11 into engagement with the anvil 13 of the piezoelectric generator 17 to produce electrical energy for flash ignition. If a flash array is present in the socket previously described, a flash will be generated to illuminate the scene to be photographed.

After a time interval related to the scene light, the exposure control circuit de-energizes the electromagnet 101 thus releasing the armature 103 to allow the closing blade 18 to move under the influence of the spring 40 to cover the exposure aperture 24.

Cocking of the shutter is effected during return of the release member 56 to the position of FIG. 1, under force of the spring 79. During such return motion, the pin 58 opens the switch $S_1$, and the lug 54 pivots the cocking element 51 counterclockwise to move the blades 16 and 18 to the position shown in FIG. 6. The lug 73 on the bottom of the release member 56 rotates the impact actuator 62 counterclockwise into position to be latched. The counterclockwise pivotal movement of the cocking element 51 tensions the spring 72 to re-position the latch 70 to latch the actuator 62. The switch $S_2$ is closed by the extension 74. The shutter 12 is now cocked and ready for another exposure. However, as the impact actuator 62 rotated counterclockwise, lug 65 moved away from the unlatching leg 31 of the piezoelectric firing spring latch 15. Since the release lug 33 of the DEP latch 120 is lightly biased into engagement with the biasing leg 30 of the firing spring latch 15 by the spring 21, as the lug 65 moved away from the unlatching leg 31, the firing spring latch 15 and the DEP latch 120 were pivoted into the positions shown in FIG. 5. In this position, the latch hook 32 of the DEP latch 120 engages the lug 65 on the impact actuator 62 to prevent movement thereof.

Thus, upon subsequent actuation of the release member 56 prior to cocking of the piezoelectric generator assembly 14, rotation of the impact actuator 62 will be restricted by the DEP latch 120 and even though the latch 70 is released, the impact actuator 62 will not move to initiate an exposure.

When the member 126 is moved in the direction of Arrow A, for example when film is advanced if the member 26 is associated with the film advance mechanism of the photographic apparatus, to cock the piezoelectric generator assembly 14, the firing spring cocking lever 19 is rotated in a clockwise direction. The firing spring engaging portion thereof engages the central portion of the firing spring 10 thereby moving the firing spring 10 away from its striking position. By means of the engagement of the free end of firing spring 10 with a cam surface 55 on the firing spring latch 15, the firing spring latch is moved until the free end of the firing spring 10 travels past the cam surface 55 and the latch hook 29 engages the free end of the firing spring 10. As the firing spring latch 15 was moved, the biasing leg 30 of the latch 15 moved the DEP latch 120 to disengage the latch hook 32 from the lug 65 on the actuator 62.

When the member 126 and the cocking lever 19 are returned to their rest positions, as shown in FIG. 1, the piezoelectric firing spring 10 is latched in its fully energized position by the latch 15 and is ready for the generation of electrical energy. The DEP latch 120 is disengaged from the actuator 62 to allow the release member 56 to initiate an exposure.

The invention has been described in detail with particular reference to a preferred embodiment thereof, but it will be understood that variations and modifications can be effected within the spirit and scope of the invention.

We claim:

1. In a photographic apparatus, the combination comprising:
   a. shutter means actuable for effecting an exposure;
   b. flash firing means, including a piezoelectric generator and a firing spring biased to move in response to actuation of said shutter from a cocked position to a striking position to strike said generator to produce a pulse of electricity, for activating a flash device associated with the photographic apparatus; and
   c. exposure prevention means associated with said shutter means and said flash firing means for preventing actuation of said shutter means if said firing spring is not in said cocked position.

2. In a photographic apparatus, the combination comprising:
   a. first means, including a shutter and a shutter actuator movable to open said shutter, for effecting an exposure;
   b. second means, including (1) a spring movable from a cocked position and (2) a first latch movable from (a) a latched position wherein said first latch is adapted to releasably retain said spring in said cocked position and (b) an unlatched position wherein said spring is not in said cocked position, for activating a flash device associated with the photographic apparatus; and
c. third means, including a second latch movable to (1) a first position in response to movement of said first latch to said unlatched position wherein said second latch is adapted to prevent shutter opening movement of said shutter actuator and (2) a second position in response to movement of said first latch to said latched position wherein said second latch does not interfere with said shutter actuator, for preventing said first means from effecting an exposure when said spring of said second means is not in said cocked position.

3. In a photographic apparatus, the combination comprising:
 a. a shutter assembly including, (1) a pivotally mounted shutter blade biased to a shutter opening position, (2) a pivotally mounted elongate latch member having a tab adapted to engage said shutter blade to releasably retain said shutter blade in a shutter closing position and to release said shutter blade upon pivotal movement of said elongate latch member, and (3) a pivotally mounted elongate actuator member adapted to be moved to initiate a photographic operation and having (a) a first lug adapted to engage said latch member to pivot said latch member and (b) a second lug;
 b. a piezoelectric flash firing assembly incuding (1) piezoelectric generator, (2) a firing spirng biased to move from a cocked position to a striking position to strike said generator, and (3) a pivotally mounted firing spring latch adapted to engage said firing spring, and including (a) an unlatching leg adapted to be engaged by said second lug on said actuator member, and (b) a biasing leg, said firing spring latch being moveable, in response to movement of said actuator member, from a latch position in which it engages and releasably retains said firing spring in said cocked position to an unlatched position in which said firing spring is released therefrom; and
 c. a pivotally mounted double exposure prevention latch having (1) a latching portion adapted to releasably engage said second lug of said actuator member and (2) a lug adapted to be engaged by said biasing leg of said firing spring latch, said double exposure prevention latch being movable to (a) an unlatching position in response to movement of said firing spring latch to said latching position wherein said latching portion is out of engagement with said second lug of said actuator and to (b) a latching position in response to movement of said firing spring latch to said unlatched position wherein said latching portion engages said second lug of said actuator member to prohibit photographic operation initiating movement of said actuator member.

* * * * *